United States Patent
Araki (10) Patent No.: US 6,597,451 B1
(45) Date of Patent: Jul. 22, 2003

(54) SPECTROMETRY MEASURING APPARATUS

(75) Inventor: Nobuhiro Araki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 356 days.

(21) Appl. No.: 09/686,934

(22) Filed: Oct. 12, 2000

(30) Foreign Application Priority Data

Oct. 14, 1999 (JP) .......................................... 11-292052

(51) Int. Cl.[7] ................................................. G01J 3/28
(52) U.S. Cl. ...................................... 356/328; 356/334
(58) Field of Search ............................... 356/305, 326, 356/328, 334

(56) References Cited

U.S. PATENT DOCUMENTS

| | | | |
|---|---|---|---|
| 4,673,292 A | * 6/1987 | Pouey | 356/334 |
| 4,747,678 A | * 5/1988 | Shafer et al. | 359/366 |
| 4,773,756 A | * 9/1988 | Blechinger | 356/334 |
| 4,832,426 A | * 5/1989 | Kaser | 359/19 |
| 5,159,492 A | * 10/1992 | Hayashi | 359/661 |
| 5,285,255 A | * 2/1994 | Baranne et al. | 356/328 |
| 5,815,261 A | * 9/1998 | Brooks et al. | 356/310 |
| 5,822,073 A | * 10/1998 | Yee et al. | 356/445 |
| 6,101,034 A | * 8/2000 | Cox et al. | 359/562 |

FOREIGN PATENT DOCUMENTS

| | | | |
|---|---|---|---|
| JP | 62-27681 | 6/1987 | |
| JP | 63-46371 | 9/1988 | |
| JP | 6-26986 | * 2/1994 | ......... G01M/11/00 |

* cited by examiner

Primary Examiner—F. L. Evans
Assistant Examiner—Kara Geisel
(74) Attorney, Agent, or Firm—Wenderoth, Lind & Ponack L.L.P.

(57) ABSTRACT

In a spectrographic type spectrometry measuring apparatus employing a concave holographic diffraction grating or a replica thereof, a small-size and light-weight spectrometry measuring apparatus having a high reliability with a spectrum position does not move in a photo detector plane in spite of an occurrence of a temperature change. This measuring apparatus is composed of a light-condensing device, a concave holographic diffraction grating or a replica thereof, and a telecentric correction lens for condensing a diffracted light from the diffraction grating telecentrically on the spectrum condensing plane. In this constitution, the spectral ray enters vertically to the spectrum focusing plane, and if the photo detector is moved in the optical axis direction due to a temperature change, the spectrum is not moved on the photo detector surface, and it is not necessary to calibrate an optical element due to an ambient temperature change.

22 Claims, 10 Drawing Sheets

27 Diffracted Light Principal Ray

Spectrum Movement

26 Photo Detector Surface

27

26 Photo Detector Surface

SPECTROMETRY MEASURING APPARATUS

FIELD OF THE INVENTION

The present invention relates to a spectrometry measuring apparatus of a spectrograph type using a concave holographic diffraction grating manufactured by a holographic method.

BACKGROUND OF THE INVENTION

A conventional spectrometry measuring apparatus of a spectrographic type using a concave holographic diffraction grating has been disclosed in Japanese Patent of Publication No. 62-27681 and Japanese Patent of Publication No. 63-46371.

Figure 8:
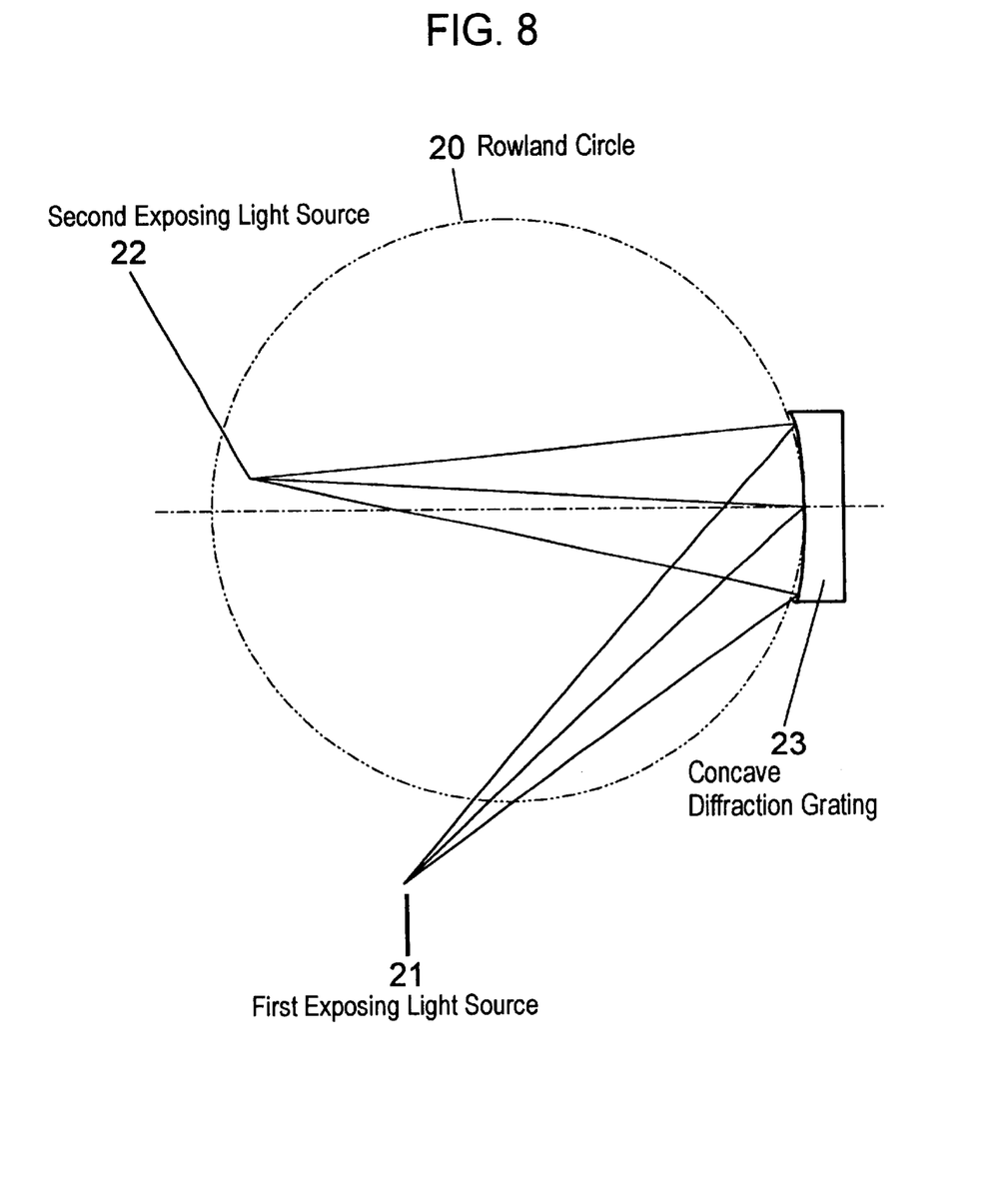
FIG. 8 illustrates an exposure layout of a concave holographic diffraction grating.
Figure 9:
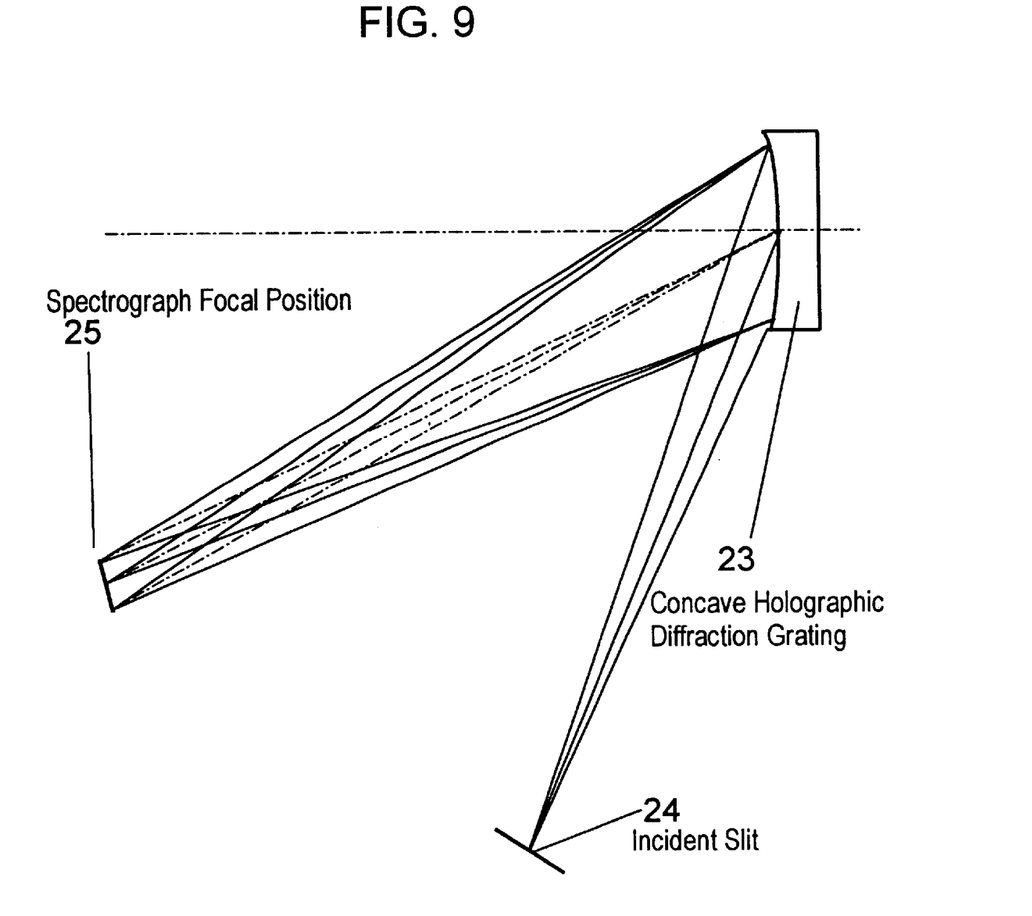
FIG. 9 illustrates a spectral layout of a conventional concave holographic diffraction grating.

For the conventional apparatus, an exposure layout for a concave holographic diffraction grating is shown in FIG. 8, and a spectral layout is shown in FIG. 9. As shown in FIG. 8, concave diffraction grating 23 is exposed by two exposure light sources 21, 22 near Rowland circle 20. Concave diffraction grating 23 exposed in the exposure condition in FIG. 8 disperses and converges a light to be measured diverged from incident slit 24 installed as shown in FIG. 9. An array sensor is placed at spectrograph focal position 25, and the spectral intensity of the dispersed light is measured.

In the concave holographic diffraction grating, since the diffraction grating also serves as a condenser, as compared with the ordinary plane diffraction grating, a collimating mirror or a condensing mirror is not necessary, and hence, the measuring apparatus is compact. It is a further advantage of this diffraction grating that the aberration state of the spectral graph in the condenser is excellent because an aberration can be corrected at the exposure position in the spectral layout.

Figures 10A, 10B:
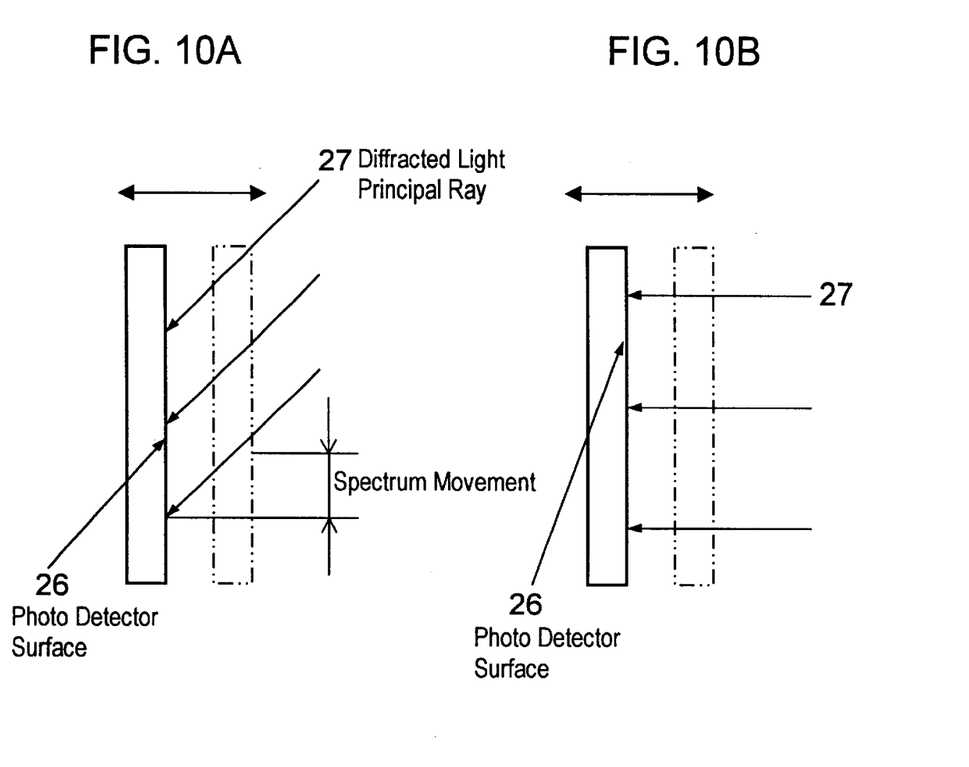
FIGS. 10A and 10B illustrate a sectional view of an optical path showing the relation between a photo detector surface and an incident ray in a conventional spectrometry apparatus.

In the prior art as shown in FIG. 10A, however, the diffracted light principal ray emitted from the center of the concave diffraction grating enters a photo detector surface 26 of a plane obliquely at a spectrograph forming position. Consequently, when the position of detector surface 26 is changed due to thermal deformation by temperature changes as shown in FIG. 10A, the spectral position varies on the detector surface 26 accordingly. The conventional apparatus must be calibrated intermittently with a reference light.

To prevent such a fluctuation of spectrum position, as shown in FIG. 10B, a telecentric configuration is required for entering diffracted light 27 vertically to detector surface 26. The problem can, be solved by a structure comprising a plane diffraction grating, a collimating, and a condensing optical system. However, since the diffraction grating surface is at the incident pupil position, to realize a telecentric configuration, the distance between the diffraction grating and the spectral condensing plane must be twice as long as the focal length of the condensing optical system. In the conventional apparatus, therefore, the optical path from the incident slit to the spectrograph detector surface increases, and the apparatus becomes larger.

Further, in the spectrometry measuring apparatus of a spectrographic type using array elements, a high reproducibility is required, in addition to the requirement for high resolution, so that the precision of measurement may not vary in spite of measuring environments, especially temperature changes.

SUMMARY OF THE INVENTION

A small-size and light-weight spectrometry measuring apparatus with high reliability is presented, in which the spectrum position on the detector surface does not change regardless of temperature changes during detection of such spectral intensity.

A optical system of the spectrometry measuring apparatus of the invention comprises: a condensing device operable to condense a light to be measured; a reflection type concave holographic am diffraction grating produced by exposure from two exposure light sources or a replica of the diffraction grating; and a diffracted-ray condensing device comprising a group of one or more lenses, one or more reflective mirrors having a curvature, or combined optical system of a lens and a mirror for condensing the diffracted-ray diffracted from the center of the diffraction grating telecentrically to a spectral condensing plane.

In the apparatus having such structure, since the spectral ray enters vertically to a photo detector surface disposed on a spectrum focal plane, if the photo detector is moved in the direction of an optical axis due to a temperature change, a spectrum is not moved on the photo detector surface. Consequently, it is not necessary to calibrate the optical element due to an ambient temperature change. Further, since the condensing operation of the concave holographic diffraction grating is directly utilized, it is not necessary to increase the distance between the concave diffraction grating and the spectral condensing plane, so that a small-size and light-weight spectrometry measuring apparatus may be provided.

DESCRIPTION OF THE PREFERRED EMBODIMENTS

Preferred embodiments of the invention will be explained with FIG. 1 through FIG. 7.

Embodiment 1

Figure 1:
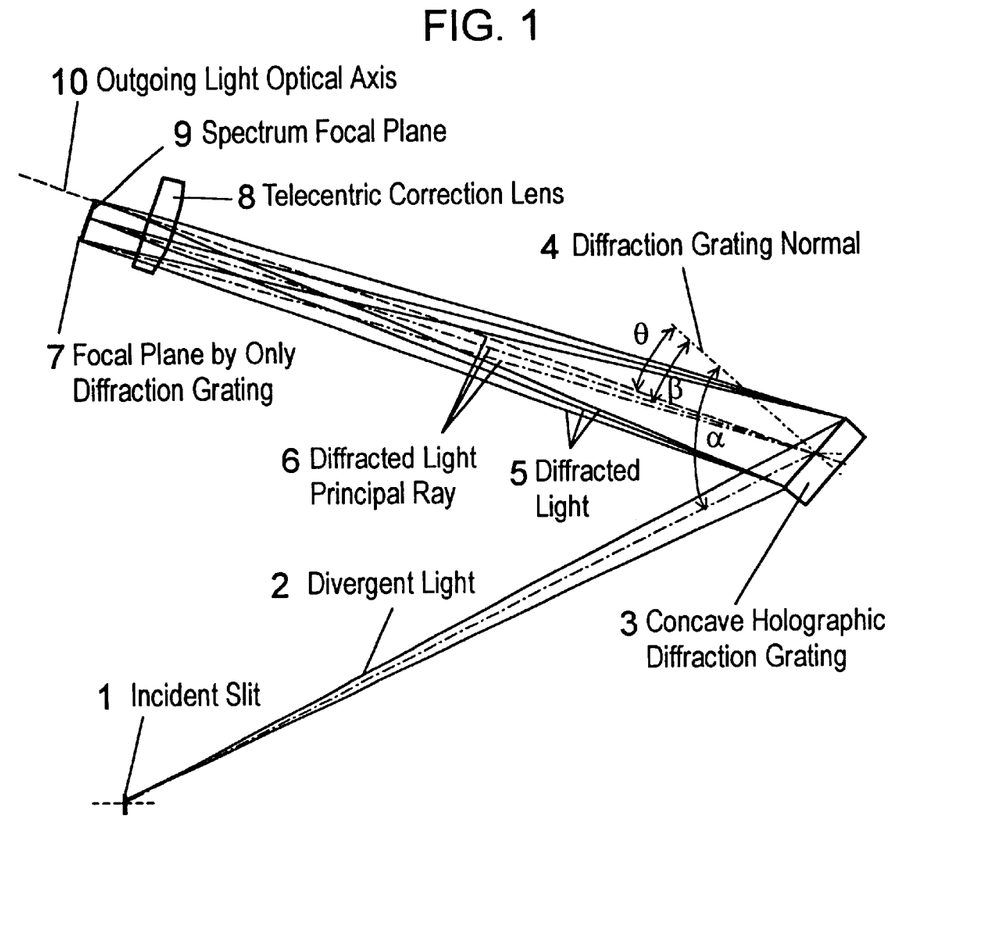
FIG. 1 illustrates a sectional view of an optical path in a spectrometry measuring apparatus of embodiment 1 of the invention.

FIG. 1 illustrates a sectional view of an optical path in a spectrometry measuring apparatus of embodiment 1 of the invention. Divergent light 2 emitted from incident slit 1 of the light source to be measured is diffracted by concave holographic diffraction grating 3 or a replica of the diffraction grating. From diffracted light 5, a spectrum is focused on focal plane 7 formed of only diffraction grating 3 disposed vertically to outgoing light optical axis 10. At this time, diffracted-light principal ray 6 projected to focal plane 7 of only the diffraction grating does not enter vertically to focal plane 7 precisely.

By telecentric correction lens 8 disposed on outgoing light optical axis 10 at a certain distance from the center of the reflection plane of concave holographic diffraction grating 3, diffracted-light 5 passing through lens 8 enters vertically to spectrum focal plane 9. An array type photo detector disposed on spectrum focal plane 9 measures the spectrograph of diffracted-light 5.

Telecentric correction lens 8 has a positive total power and is disposed at the distance between a principal plane of the front side of lens 8 and the center of the concave holographic diffraction grating in a tolerance of ±20% of the focal length of lens 8. In this configuration, supposing the distance from the optical axis of lens 8 to the spectrum position on the spectrum focal plane to be Y mm, and the total focal length of lens 8 to be f mm, the incident angle of the spectrum principal ray entering the focal plane is vertical to the focal plane with a tolerance suppressed within a deviation of $\tan^{-1}(Y/4f)$.

Therefore, if the photo detector is moved in the direction of outgoing light optical axis 10 due to a temperature change, the spectrum is not moved on the photo detector surface, and it is not necessary to calibrate an optical element due to an ambient temperature change. Further, since the condensing operation of concave holographic diffraction grating 3 is directly utilized, the distance between focal plane 9 and diffraction grating 3 does not increase significantly from one in the case of the absence of lens 8, so that a small-size and light-weight spectrometry measuring apparatus is provided.

In this embodiment, incident angle α to concave holographic diffraction grating 3, outgoing angle β, angle θ formed between outgoing light optical axis 10 and diffraction grating normal line 4, radius of curvature R of diffraction grating 3, grating constant g at the center, focal length f of telecentric correction lens 8, and distance T from the center of diffraction grating 3 to a principal plane of the front side of lens 8 are as follows:

Incident angle α=68.755 deg.;
Outgoing angle β=21.967 deg. (wavelength 753 nm), 23.638 deg. (wavelength 768.5 nm), 25.331 deg. (wavelength 784 nm);
θ=22.124 deg.;
Radius of curvature R=454.7 mm;
Grating constant g=1735.55 lines/mm;
Focal length f=438.22 mm; and
Distance T=432.63 mm.

In this embodiment, the same effects are obtained if telecentric correction lens 8 is composed of a group of one or more lenses.

Embodiment 2

Figure 2:
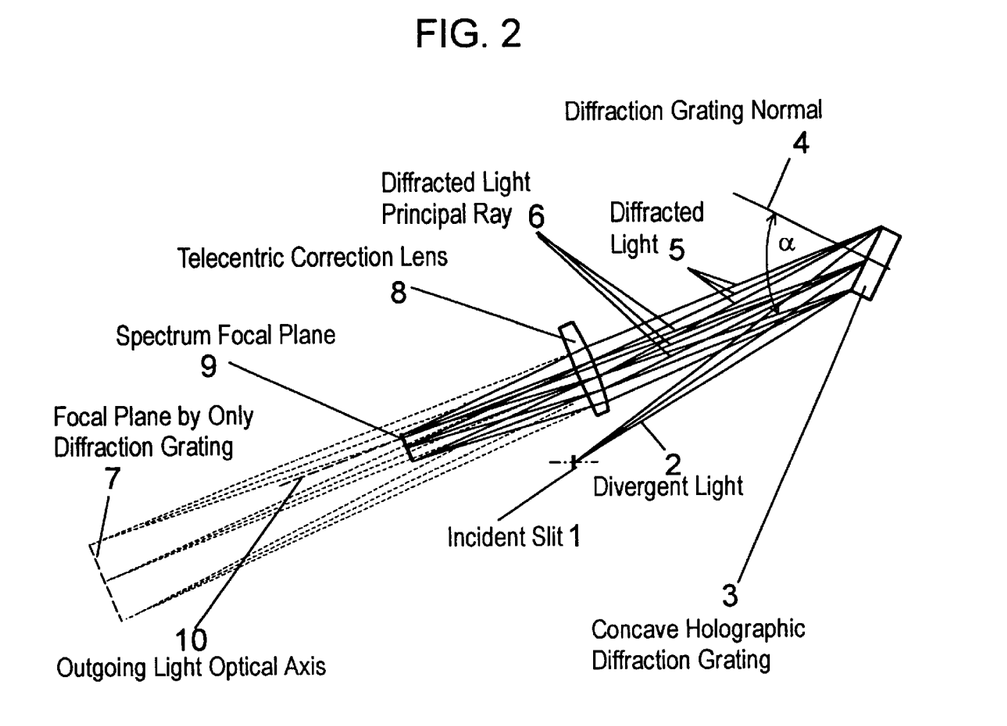
FIG. 2 illustrates a sectional view of an optical path in a spectrometry measuring apparatus of embodiment 2 of the invention.

FIG. 2 shows embodiment 2 of the invention. Same as in embodiment 1, divergent light 2 emitted from incident slit 1 of the light source to be measured is diffracted by concave holographic diffraction grating 3 or a replica of the diffraction grating. From diffracted light 5, a spectrum is focused on focal plane 7 formed of only diffraction grating 3 disposed vertically to outgoing light optical axis 10. By telecentric correction, lens 8 disposed on the outgoing light optical axis 10 at a certain distance from the center of a reflection plane of concave holographic diffraction grating 3, diffracted-light 5 passing through lens 8 enters vertically to spectrum focal plane 9. An array type photo detector disposed on spectrum focal plane 9 measures a spectrograph of diffracted-light 5.

Telecentric correction lens 8, through which the diffracted-light from concave holographic diffraction grating 3 passes, has a positive total power, and lens 8 is disposed at the distance between a principal plane of the front side of lens 8 and the center of the concave holographic diffraction grating in a tolerance of ±20% of the focal length of lens 8. In this configuration, supposing the distance from an optical axis of telecentric correction lens 8 to the spectrum position in the spectrum focal plane to be Y mm, and the total focal length of lens 8 to be f mm, the incident angle of the spectrum principal ray entering the focal plane is vertical to the focal plane with a tolerance suppressed within a deviation of $\tan^{-1}(Y/4f)$.

Therefore, if the photo detector is moved in the direction of outgoing light optical axis 10 due to a temperature change, the spectrum is not moved on the photo detector surface, and it is not necessary to calibrate an optical element due to an ambient temperature change. Further, since the condensing operation of concave holographic diffraction grating 3 is directly utilized, the distance between focusing plane 9 and diffraction grating 3 does not increase significantly from one between diffraction grating 3 and focal plane 7 composed of only diffraction grating 3, so that a small-size and light-weight spectrometry measuring apparatus is provided.

In this embodiment, incident angle (t to concave holographic diffraction grating 3, outgoing angle β, angle θ formed between outgoing light optical axis 10 and diffraction grating normal line 4, radius of curvature R of diffraction grating 3, grating constant g at the center, focal length f of telecentric correction lens 8, and distance T from the center of diffraction grating 3 to a principal plane of the front side of lens 8 are as follows:

Incident angle α=61.465 deg.;
Outgoing angle β=46.882 deg. (wavelength 753 nm), 49.735 deg. (wavelength 768.5 nm), 52.766 deg. (wavelength 784 nm);
θ=47.935 deg.;
Radius of curvature R=600.909 mm;
Grating constant g=2136.09 lines/mm;
Focal length f=250.398 mm; and
Distance T=248.352 mm.

In this embodiment, the same effects are obtained if the telecentric correction lens 8 is composed of a group of one or more lenses.

Embodiment 3

Figure 3:
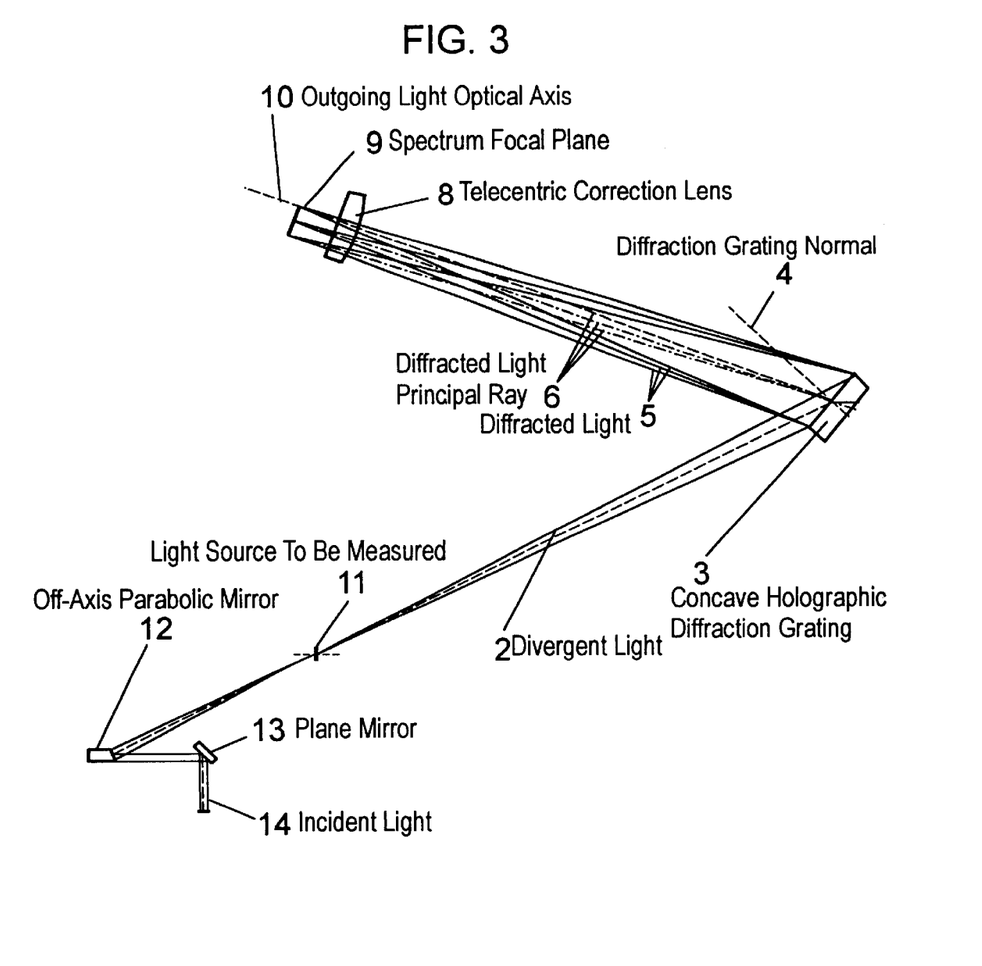
FIG. 3 illustrates a sectional view of an optical path in a spectrometry measuring apparatus in embodiment 3 of the invention.

FIG. 3 shows embodiment 3 of the invention. The outgoing side of concave holographic diffraction grating 3 is composed and arranged in the same manner as in embodiment 1. As the light source to be measured, an infinite conjugate light enters as incident light 14, and incident light 14 is condensed by plane mirror 13 and off-axis parabolic mirror 12. In such light source 11 to be measured, the same effect as in embodiment 1 is also obtained.

Embodiment 4

Figure 4:
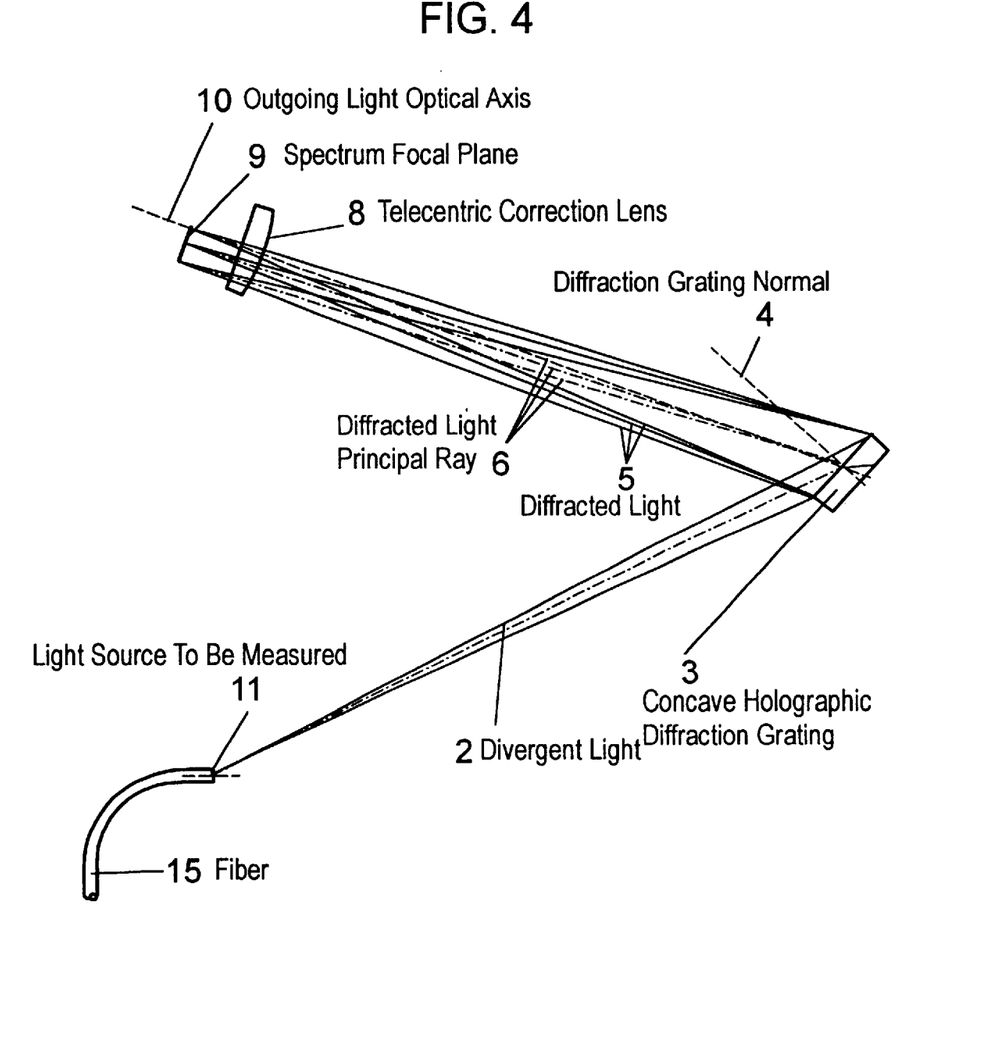
FIG. 4 illustrates a sectional view of an optical path in a spectrometry measuring apparatus in embodiment 4 of the invention.

FIG. 4 shows embodiment 4 of the invention. The outgoing side of concave holographic diffraction grating 3 is composed and arranged in the same manner as in embodiment 1, and the light source to be measured is a ray emitted from a fiber. In such emitted light source 11 to be measured, the same effect as in embodiment 1 is also provided.

Embodiment 5

Figure 5:
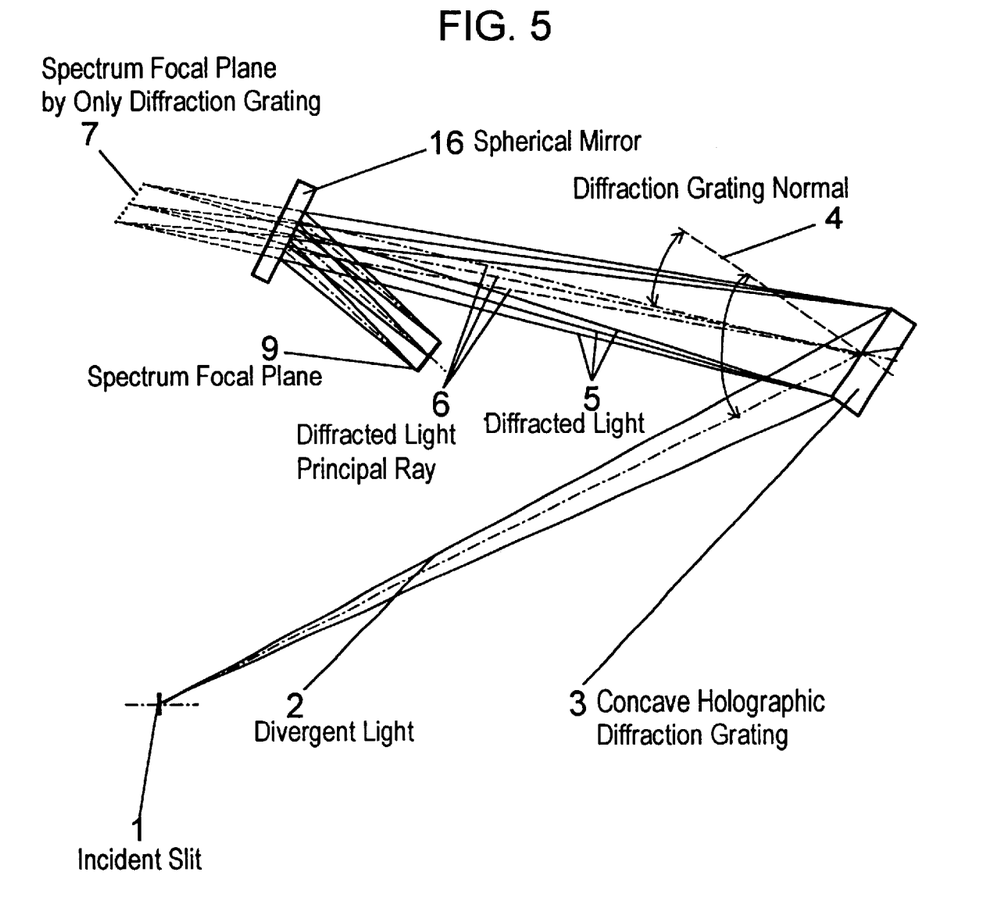
FIG. 5 illustrates a sectional view of an optical path in a spectrometry measuring apparatus in embodiment 5 of the invention.

FIG. 5 shows embodiment 5 of the invention. Divergent light 2 emitted from incident slit 1 of the light source to be measured is diffracted by concave holographic diffraction grating 3 or a replica of the grating. From diffracted light 5, a spectrum is focused on focal plane 7 formed by only diffraction grating 3. At this time, diffracted light principal ray 6 does not enter vertically to focal plane 7 precisely.

Herein, spherical mirror 16 is disposed on outgoing light optical axis 10 at a certain distance from the center of the reflection plane of concave holographic diffraction grating 3, and diffracted light 5 reflected by spherical mirror 16 enters vertically to spectrum focal plane 9. Its spectrograph is measured by an array type photo detector disposed on focal plane 9.

At this time, spherical mirror 16 through which the diffracted light leaving concave holographic diffraction grating 3 passes has a positive total power, and mirror 16 is disposed at the distance between the principal plane of the front side thereof and the center of the concave holographic diffraction grating within the tolerance of ±20% of the focal length of mirror 16. In this configuration, supposing the distance from the optical axis of spherical mirror 16 to the spectrum position on spectrum focal plane 9 to be Y mm, and the total focal length of spherical mirror 16 to be f mm, the incident angle of the spectrum principal ray entering the focal plane is vertical to the focal plane with a tolerance suppressed within a deviation of $\tan^{-1}(Y/4f)$.

Therefore, if the photo detector is moved in the direction of outgoing light optical axis 10, the spectrum is not moved on the photo detector surface due to a temperature change, and it is not necessary to calibrate an optical element due to an ambient temperature change. Further, since the condensing operation of concave holographic diffraction grating 3 is directly utilized, the distance between focal plane 9 and diffraction grating 3 does not increase significantly from one in the case of only diffraction grating 3, so that a small-size and light-weight spectrometry measuring apparatus is provided.

In this embodiment, the incident angle α to concave holographic diffraction grating 3, outgoing angle β, radius of curvature R of concave holographic diffraction grating 3, grating constant g at the center, focal length f of spherical mirror 16, and distance T from the center of concave holographic diffraction grating 3 to the center of spherical mirror 16, that is, the principal plane are as follows:

Incident angle α=60.233 deg.;
Outgoing angle β=20.822 deg. (wavelength 753 nm), 22.375 deg. (wavelength 768.5 nm), 23.946 deg. (wavelength 784 nm);
Radius of curvature R=317.439 mm;
Grating constant g=1626.00 lines/mm;
Focal length f=300.000 mm; and
Distance T=314.015 mm.

In this embodiment, the same effects are obtained if spherical mirror 16, is composed of a group of one or more mirrors.

Embodiment 6

Figure 6:
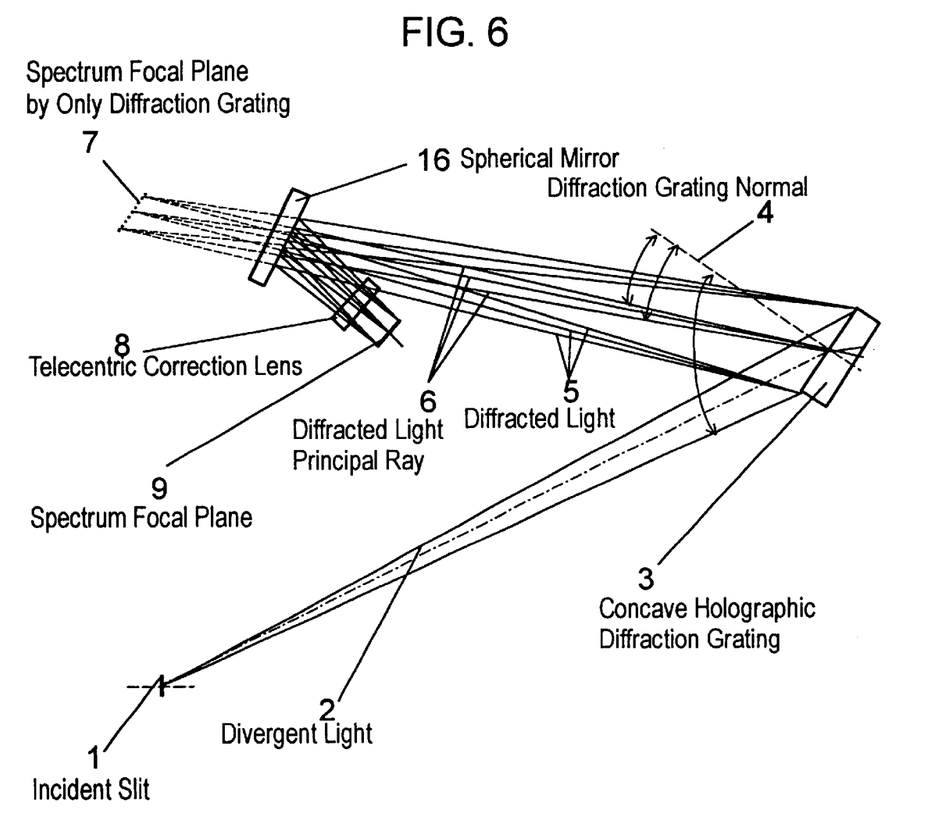
FIG. 6 illustrates a sectional view of an optical path in a spectrometry measuring apparatus in embodiment 6 of the invention.

FIG. 6 shows embodiment 6 of the invention. Divergent light 2 emitted from incident slit 1 of the light source to be measured is diffracted by concave holographic diffraction grating 3 or a replica of the grating, and from diffracted light 5, a spectrum is focused on focal plane 7 formed by only the diffraction grating. At this time, diffracted light principal ray 6 projected on focal plane 7 does not enter vertically to the focal plane precisely.

Accordingly, by spherical mirror 16 and telecentric correction lens 8 disposed at a certain distance from the center of the reflection plane of concave holographic diffraction grating 3, diffracted light 5 is reflected on spherical mirror 16, passes through telecentric correction lens 8, and enters vertically to spectrum focal plane 9. Its spectrograph is measured by an array type photo detector disposed on focal plane 9.

At this time, spherical plane 16 and telecentric correction lens 8 have a total positive power, and the distance between (i) a principal plane of the total front side of mirror 16 and lens 8 and (ii) the center of diffraction grating 3 is in a range of ±20% of the total focal length of mirror 16 and lens 8. Supposing the distance from the outgoing ray optical axis, composed of spherical mirror 16 and telecentric correction lens 8 to the spectrum position in spectrum focal plane 9 to be Y mm, and the total focal length of spherical mirror 16 to be f mm, the incident angle of the spectrum principal ray entering focal plane 9 is vertical to focal plane 9 with a tolerance suppressed within a deviation of $\tan^{-1}(Y/4f)$.

Therefore, even if the photo detector is moved in the direction of the optical axis, the spectrum is not moved on the photo detector surface due to a temperature change, and it is not necessary to calibrate an optical element due to an ambient temperature change. Further, since the condensing operation of concave holographic diffraction grating 3 is directly utilized, the distance between diffraction grating 3 and focal plane 9 does not increase significantly from one in the case of only diffraction grating 3, so that a small-size and light-weight spectrometry measuring apparatus is provided.

In this embodiment, incident angle α to concave holographic diffraction grating 3, outgoing angle β, radius of curvature R of concave holographic diffraction grating 3, grating constant g at the center, total focal length f of spherical mirror 16 and telecentric correction lens 8, and distance T from the center of concave holographic diffraction grating 3 to the principal plane of the front side in total of spherical mirror 16 and telecentric correction lens 8 are as follows:

Incident angle α=60.233 deg.;
Outgoing angle β=20.822 deg. (wavelength 753 nm), 22.375 deg. (wavelength 768.5 nm), 23.946 deg. (wavelength 784 nm);
Radius of curvature R=317.439 mm;
Grating constant g=1626.00 lines/mm;
Focal length f=354.180 mm; and
Distance T=352.222 mm.

In this embodiment, the same effects are obtained even if spherical mirror 16 is composed of a group of one or more mirrors.

Further, in this embodiment, the same effects are obtained even if telecentric correction lens 8 is composed of a group of one or more lenses.

Embodiment 7

Figure 7:
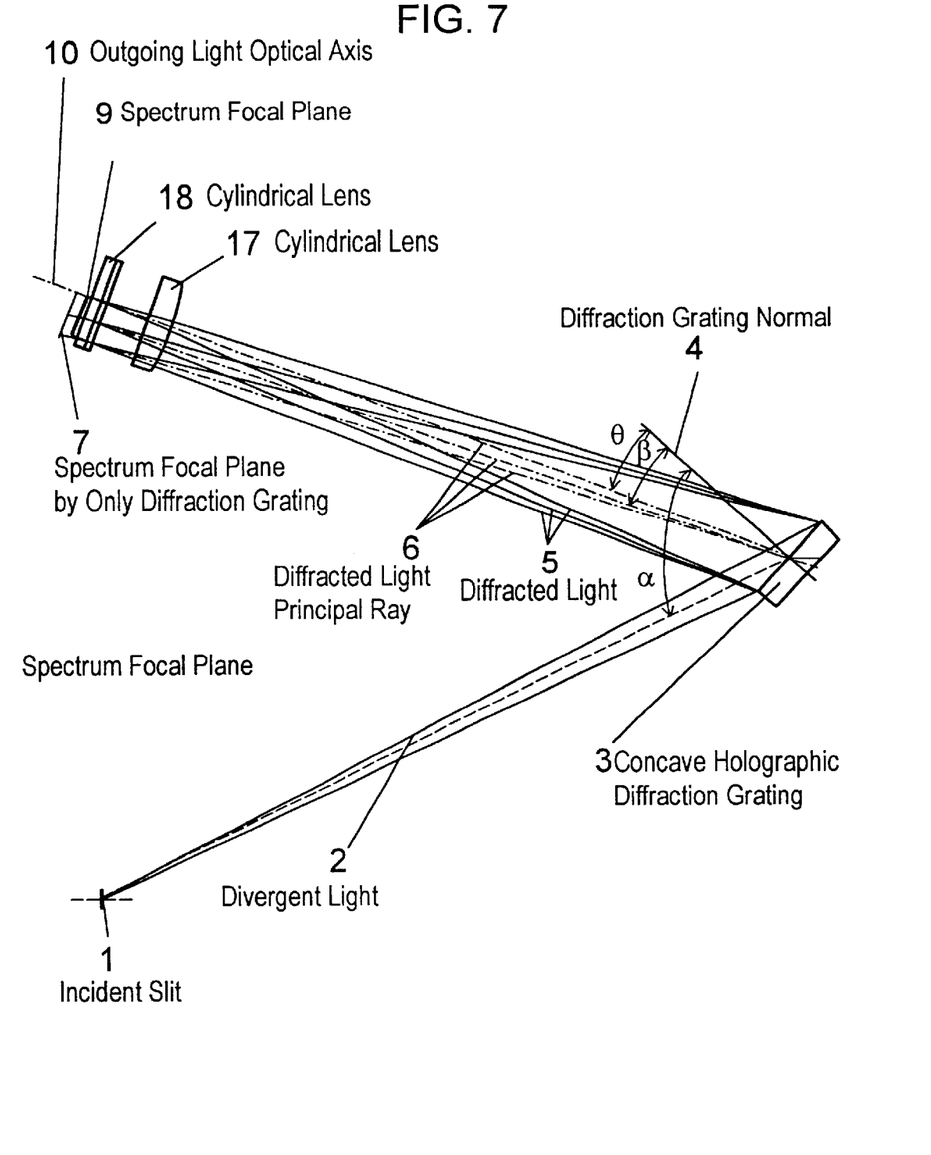
FIG. 7 illustrates a sectional view of an optical path in a spectrometry measuring apparatus in embodiment 7 of the invention.

FIG. 7 shows embodiment 7 of the invention, in which divergent light 2 emitted from incident slit 1 of the light source to be measured is diffracted by concave holographic diffraction grating 3 or a replica of the grating. From diffracted light 5, a spectrum is focused on focal plane 7 formed by only the diffraction grating disposed vertically to outgoing light optical axis 10 according to a specific focusing relation. At this time, diffracted light principal ray 6 projected on focal plane 7 of only the diffraction grating does not enter vertically to the focal plane precisely.

Accordingly, by cylindrical lens 17 having a power in a spectral plane and cylindrical lens 18 having a power in a non-spectral plane disposed on outgoing light optical axis 10 at a certain distance from the center of the reflection plane of concave holographic diffraction grating 3, diffracted light 5 passing through lenses 17, 18 enters vertically to spectrum focal plane 9. Its spectrograph is measured by an array type photo detector disposed on focal plane 9.

At this time, cylindrical lens 17 having a curvature in the spectral plane has a positive power, and the distance between the principal plane of the front side of cylindrical lens 18 having a curvature in the non-spectral plane and the center of concave holographic diffraction grating 3 is in a range of ±20% of the focal length of lens 18. Therefore, supposing the distance from the outgoing ray optical axis composed of lenses 17, 18 to the spectrum position in spectrum focal plane 9 to be Y mm, and the total focal length of the lens group to be f mm, the incident angle of the spectrum principal ray entering focal plane 9 is vertical to plane 9 with a tolerance suppressed within a deviation of $\tan^{-1}(Y/4f)$.

Therefore, even if the photo detector is moved in the direction of outgoing light optical axis 10, the spectrum is not moved on the photo detector surface due to a temperature change, and it is not necessary to calibrate an optical element due to an ambient temperature change. Further, since the condensing operation of concave holographic diffraction grating 3 is directly utilized, the distance between focal plane 9 and diffraction grating 3 does not increase significantly from one in the case of only diffraction grating 3, so that a small-size and light-weight spectrometry measuring apparatus is provided.

In this embodiment, incident angle α to concave holographic diffraction grating 3, outgoing angle β, angle θ formed between outgoing light optical axis 10 and diffraction grating normal line 4, radius of curvature R of diffraction grating 3, grating constant g at the center, focal length f in total of cylindrical lenses 17, 18 in the spectral direction plane, and distance T between the center of diffraction grating 3 and the principal plane of the front side in the spectral direction plane in total of cylindrical lenses 17, 18 are as follows:

Incident angle α=66.336 deg.;
Outgoing angle f=23.014 deg. (wavelength 753 nm), 24.700 deg. (wavelength 768.5 nm), 26.407 deg. (wavelength 784 nm);
θ=22.276 deg.;
Radius of curvature R=454.7 mm;
Grating constant g=1735.55 lines/mm;
Focal length f=432.41 mm; and
Distance T=428.65 mm.

In this embodiment, the same effects are obtained even if each of cylindrical lenses 17, 18 is composed of a group of one or more lenses.

What is claimed is:

1. A spectrometry measuring apparatus comprising:
   a condensing device operable to condense a light to be measured;
   a diffraction grating of a reflection type having a concave shape; and
   a diffracted-ray condensing device operable to condense a diffracted-ray diffracted from a center of said diffraction grating telecentrically to a spectrum condensing plane of said diffraction grating, wherein the diffracted-ray is non-telecentric.

2. The spectrometry measuring apparatus of claim 1, wherein:
   said diffracted-ray condensing device has a positive power in total; and
   a distance between a principal plane of a front side of said diffracted-ray condensing device and a center of said diffraction grating is in a range of 80% to 120% of a focal length of said diffracted-ray condensing device.

3. The spectrometry measuring apparatus of claim 1, wherein said diffraction grating comprises one of a holographic diffraction grating of a reflection type having a concave shape which is composed by exposure from two exposure light sources, and a replica of the holographic diffraction grating.

4. The spectrometry measuring apparatus of claim 1, wherein said condensing device is composed of at least one of an incident slit, a condensing optical system, and a fiber.

5. A spectrometry measuring apparatus comprising:
   a condensing device operable to condense a light to be measured;
   a diffraction grating of a reflection type having a concave shape; and
   a lens group comprising at least one lens operable to condense a diffracted-ray diffracted from a center of said diffraction grating telecentrically to a spectrum condensing plane of said diffraction grating, wherein the diffracted-ray is non-telecentric.

6. The spectrometry measuring apparatus of claim 5, wherein:
   said lens group has a positive power in total; and
   a distance between a principal plane of a front side of said lens group and a center of said diffraction grating is in a range of 80% to 120% of a focal length of said lens group.

7. The spectrometry measuring apparatus of claim 5, wherein said diffraction grating comprises one of a holographic diffraction grating of a reflection type having a concave shape which is composed by exposure from two exposure light sources, and a replica of the holographic diffraction grating.

8. The spectrometry measuring apparatus of claim 5, wherein said condensing device is composed of at least one of an incident slit, a condensing optical system, and a fiber.

9. A spectrometry measuring apparatus comprising:
   a condensing device operable to condense a light to be measured;
   a diffraction grating of a reflection type having a concave shape; and
   a reflective mirror group comprising at least one reflective mirror having a curvature operable to condense a diffracted-ray diffracted from a center of said diffraction grating telecentrically to a spectrum condensing plane of said diffraction grating, wherein the diffracted-ray is non-telecentric.

10. The spectrometry measuring apparatus of claim 9, wherein:
    said reflective mirror group has a positive power in total; and
    a distance between a principal plane of a front; side of said reflective mirror group and a center of said diffraction grating is in a range of 80% to 120% of the focal length of said reflective mirror group.

11. The spectrometry measuring apparatus of claim 9, wherein said diffraction grating comprises one of a holographic diffraction grating of a reflection type having a concave shape which is composed by exposure from two exposure light sources, and a replica of the holographic diffraction grating.

12. The spectrometry measuring apparatus of claim 9, wherein said condensing device is composed of at least one of an incident slit, a condensing optical system, and a fiber.

13. A spectrometry measuring apparatus comprising:
   a condensing device operable to condense a light to be measured;
   a diffraction grating of a reflection type having a concave shape;
   a reflective mirror group comprising at least one reflection mirror having a curvature operable to condense a diffracted-ray diffracted from a center of said diffraction grating telecentrically to a spectrum condensing plane of said diffraction grating, wherein the diffracted-ray is non-telecentric; and
   a lens group comprising at least one lens.

14. The spectrometry measuring apparatus of claim 13, wherein:
   said reflective mirror group and said lens group have a positive power in total; and
   a distance between a principal plane of a front side in total of said reflective mirror group and said lens group and a center of said diffraction grating is in a range of 80% to 120% of a focal length in total of said reflective mirror group and said lens group.

15. The spectrometry measuring apparatus of claim 13, wherein said diffraction grating comprises one of a holographic diffraction grating of a reflection type having a concave shape which is composed by exposure from two exposure light sources, and a replica of the holographic diffraction grating.

16. The spectrometry measuring apparatus of claim 13, wherein said condensing device is composed of at least one of an incident slit, a condensing optical system, and a fiber.

17. A spectrometry measuring apparatus comprising:
   a condensing device operable to condense a light to be measured;
   a diffraction grating of a reflection type having a concave shape;
   a first cylindrical lens group comprising at least one cylindrical lens having a curvature in a spectral plane operable to condense a diffracted-ray diffracted from a center of said diffraction grating telecentrically to a spectrum condensing plane of said diffraction grating; and
   a second cylindrical lens group comprising at least one cylindrical lens having a curvature in a non-spectral direction.

18. The spectrometry measuring apparatus of claim 17, wherein:
   said first cylindrical lens group has a positive power in total; and
   a distance between a principal plane of a front side in total of said first cylindrical lens group and a center of said diffraction grating is in a range of 80% to 120% of a focal length in total of said first cylindrical lens group.

19. The spectrometry measuring apparatus of claim 17, wherein said diffraction grating comprises one of a holographic diffraction grating of a reflection type having a concave shape which is composed by exposure from two exposure light sources, and a replica of the holographic diffraction grating.

20. The spectrometry measuring apparatus of claim 17, wherein said condensing device is composed of at least one of an incident slit, a condensing optical system, and a fiber.

21. A spectrometry measuring method comprising:
   condensing light to be measured;
   providing a diffraction grating of a reflection type having a concave shape; and
   condensing a diffracted-ray diffracted from a center of the diffraction grating telecentrically to a spectrum condensing plane of the diffraction grating, wherein the diffracted-ray is non-telecentric.

22. A spectrometry measuring method comprising:
   condensing light to be measured;
   providing a diffraction grating-of a reflection type having a concave shape;
   condensing a diffracted-ray diffracted from a center of the diffraction grating telecentrically to a spectrum condensing plane of the diffraction grating by using at least one cylindrical lens having a curvature in a spectral plane; and
   providing at least one cylindrical lens having a curvature in a non-spacial direction.

* * * * *

UNITED STATES PATENT AND TRADEMARK OFFICE
CERTIFICATE OF CORRECTION

PATENT NO. : 6,597,451 B1
DATED : July 22, 2003
INVENTOR(S) : Nobuhiro Araki

It is certified that error appears in the above-identified patent and that said Letters Patent is hereby corrected as shown below:

Column 8,
Line 64, please replace "front; side" with -- front side --.

Column 10,
Line 37, please replace "grating-of" with -- grating of --.

Signed and Sealed this

Ninth Day of December, 2003

JAMES E. ROGAN
*Director of the United States Patent and Trademark Office*